Patented Feb. 28, 1933

1,899,674

UNITED STATES PATENT OFFICE

LEO P. CURTIN, OF CRANBURY, NEW JERSEY, ASSIGNOR TO THE WESTERN UNION TELEGRAPH COMPANY, OF NEW YORK, N. Y., A CORPORATION OF NEW YORK

PROCESS FOR THE PRODUCTION OF FERRIC OXALATE

No Drawing.   Application filed April 28, 1932. Serial No. 608,143.

The process of the present invention is particularly designed for the production of normal ferric oxalate from ferrous oxalate.

Ferric oxalate is difficult to manufacture because it is very highly soluble and does not crystallize satisfactorily and therefore is difficult to separate from the other components of a reaction mixture in which it is formed, such as the sodium sulfate resulting from the interaction of sodium oxalate and ferric sulfate. Ferrous oxalate, on the other hand, is very easy to prepare. It is a yellow crystalline salt having a solubility in water of only about 220 parts per million and can therefore be precipitated efficiently from a reaction mixture of ferrous sulfate and sodium oxalate and recovered by decantation or filtration.

In accordance with my invention, ferrous oxalate is converted into ferric oxalate by combining each two molecules of the ferrous oxalate with one molecule of oxalic acid with the aid of a suitable oxidizing agent. My preferred oxidizing agent is hydrogen peroxide which I have found to have the advantages that it quickly and quantitatively converts the ferrous ion to the ferric ion, leaving no residue or impurity in the reaction mixture other than water. Moreover if not used in considerable excess it does not react appreciably with the oxalic acid or oxalate radical as might be expected in view of the rather strong reducing action of the latter in the presence of many oxidizing or reducible agents.

While many other substances have the power to oxidize the ferrous ion, some of them, such as potassium permanganate and chromic acid, are capable of simultaneously attacking oxalic acid. Oxalic acid is quantitatively estimated by titration with potassium permanganate and the oxidation of oxalic acid by chromic acid is extensively utilized in the dyeing of wool.

Electrolytic oxidation is objectionable because of the tendency of ferrous and ferric ion to migrate to the cathode, the reducing electrode, while oxalate ion moves to the anode where, if the electromotive force is sufficiently high it is destroyed by oxidation to carbon dioxide.

Oxidation of the ferrous ion by hydrogen peroxide has the unique advantages of (1) leaving no residue and (2) not attacking the oxalate ion unless used in excess.

The conversion is illustrated by the following reaction equation:

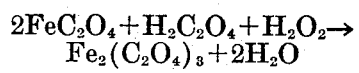

$$2FeC_2O_4 + H_2C_2O_4 + H_2O_2 \rightarrow Fe_2(C_2O_4)_3 + 2H_2O$$

This reaction may be employed not only to form ferric oxalate, but to preserve solutions thereof which have a tendency to decompose or break down especially when subjected to actinic light such as ultra violet or sunlight by continuously or from time to time adding a small quantity of hydrogen peroxide to the solution.

As will be apparent, the same method, i. e. addition of hydrogen peroxide, may be employed for regenerating a solution of ferric oxalate in which decomposition has already occurred with the formation and precipitation of ferrous oxalate. The decomposition of ferric oxalate referred to involves the breaking up of the oxalate radical with the liberation of carbon dioxide, and it is, of course, necessary in regenerating such a ferric oxalate solution to add oxalic acid to take the place of that which has decomposed.

The following specific example illustrates my invention:

Ferrous oxalate and oxalic acid both in fairly finely divided condition are suspended in water and while the suspension is maintained by agitation an aqueous solution of hydrogen peroxide is gradually added. As stated above, the action of the hydrogen peroxide in converting the ferrous oxalate to ferric oxalate is rapid and efficient and the hydrogen peroxide solution can therefore be added quite rapidly. The reagents react practically quantitatively in accordance with the reaction equation given above so that only slight excesses of the oxalic acid and hydrogen peroxide are required for complete conversion of the ferrous oxalate to the ferric oxalate.

Since, as stated above, ferric oxalate is highly soluble while both ferrous oxalate and oxalic acid are relatively insoluble, it is only necessary to use enough water in mixing the ferrous oxalate and oxalic acid to produce a mixture that can be stirred freely. In a specific instance, 360 parts by weight of ferrous oxalate hexahydrate and 126 parts by weight of oxalic acid dihydrate were suspended in 2,000 parts by weight of water at a temperature of about 20° C. and to this mixture there was added while continuously stirring 140 parts by weight of a 25% solution of hydrogen peroxide over a period of 20 minutes. Reaction was complete in 30 minutes.

I claim:

1. A method of preparing ferric oxalate which comprises introducing hydrogen peroxide into an aqueous solution containing ferrous oxalate and oxalic acid.

2. A method as defined in claim 1 in which the hydrogen peroxide is introduced into an aqueous suspension of finely divided ferrous oxalate and oxalic acid under agitation.

3. A method as defined in claim 1 in which ferrous oxalate and oxalic acid in substantially the proportions of two molecules of ferrous oxalate to one molecule of oxalic acid are suspended in water and substantially one molecule of hydrogen peroxide is gradually added to the suspension under agitation.

In testimony whereof, I affix my signature.

LEO P. CURTIN.